United States Patent Office 3,741,953
Patented June 26, 1973

1

2

3,741,953

GUANIDINOSULFONYLPHENYL AZO PIGMENTS HAVING ACETOACETAMIDOPHENYL COUPLING COMPONENT RADICALS

Armand Henrard, Gand, Belgium, and Fritz Kehrer and Hans Wasem, Basel, Switzerland, assignors to Sandoz Ltd., Basel, Switzerland No Drawing. Continuation-in-part of application Ser. No. 691,707, Dec. 19, 1967, now Patent No. 3,598,803. This application Sept. 30, 1970, Ser. No. 77,015
Claims priority, application Switzerland, Jan. 17, 1967, 630/67, Patent 476,802; Jan. 26, 1967, 1,173/67, Patent 475,304
Int. Cl. C09b *29/32*
U.S. Cl. 260—193 3 Claims

ABSTRACT OF THE DISCLOSURE

Pigments of the monoazo series which contain a nuclearly bound sulfonic acid imido-ureide group and are, e.g., of the formula

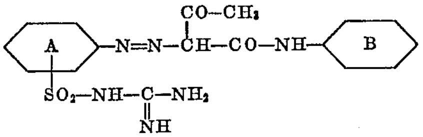

are useful for the coloration of plastics, textiles, paper, natural resins and rubber. The resultant dyeings are very fast to migration and light and show good heat stability.

This application is a continuation-in-part of copending application Ser. No. 691,707, filed Dec. 19, 1967 and now U.S. Pat. 3,598,803.

It was found that azo compounds of the formula

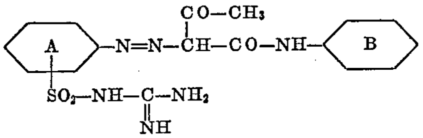

(I)

wherein each of nuclei A and B is either further unsubstituted or further substituted, suitable substituents for such further substituted nuclei including chloro, bromo, methyl and methoxy; are very useful pigment dyestuffs.

The new compounds are produced by diazotizing a guanidinosulfonyl-substituted aniline of the formula

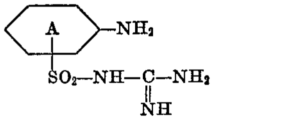

(II)

and coupling the resulting diazonium compound with a compound of the formula

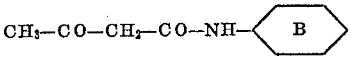

(III)

The coupling reaction is conducted in the normal manner in a weakly acid, neutral or alkaline medium at room temperature or with cooling.

The new compounds have outstanding properties as pigments. They are virtually insoluble in the commonly used solvents and have very good rheological properties. Applications for which they are suitable include the dyeing of paper stock, the mass coloration of plastics in solution or other forms, the coloration of natural and synthetic resins and rubber, and the printing of textiles and paper.

It is advantageous to prepare the pigments in paste form before application. For thus purpose they are submitted to mechanical treatment in ball or roller mills or other suitable equipment and if necessary in the presence of dispersing agents, such as the condensation products of naphthalenesulphonic acids and formaldehyde. The pigment pastes can be used for pigmentation in the paste form as obtained, or they can be dried and the resulting powders ground.

In the aforenamed materials the pigments are outstandingly resistant to migration and fast to light, and have very good fastness to washing, chlorine, hypochlorite and peroxide bleaching, cross dyeing, blind vats, hydrosulphite, dry cleaning, rubbing, overlacquering and solvents. They show good transparency and heat stability.

The parts and percentages given in the following example are by weight and the temperatures are in degrees centigrade.

EXAMPLE 1

6.85 parts of 1 - amino - 2,5 - dimethoxybenzene-4-sulphonic acid imidoureide are dissolved in 100 parts of water and 16 parts of 30% hydrochloric acid and subsequently diazotized at 0–5° with 25 parts of 1 normal sodium nitrite solution. The diazonium solution is filtered and adjusted to pH 3.5 with aqueous sodium acetate solution. 0.4 part of the adduct of 20 moles of ethylene oxide on 1 mole of oleyl alcohol are added. In the next 30 minutes a solution of 7.1 parts of 1-acetoacetylamino-2,5-dimethoxy-4-chlorobenzene in 100 parts of water and 6 parts of 30% sodium hydroxide solution is allowed to flow in at 0–10° with stirring. Stirring is continued for 1 hour, then the reaction mixture is raised to 80–85° and filtered.

The filtercake is washed with water and vacuum dried at 60°. A yellow pigment in a yield of 14 parts is obtained; it is applicable, for example, in plasticized polyvinyl chloride (PVC), which it pigments in yellow shades, showing very good light fastness, heat stability and resistance to migration.

The tabulated examples which follow, give the formulae of further diazo components and coupling components, which may be reacted as detailed in Example 1.

| Example No. | Diazo-component | Coupling-component | Shade in PVC |
|---|---|---|---|
| 2 | 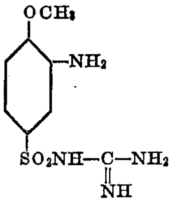 | 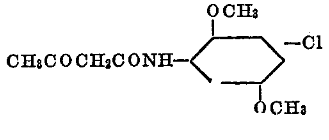 | Yellow. |

TABLE—Continued
| Example No. | Diazo-component | Coupling-component | Shade in PVC |
|---|---|---|---|
| 3 | 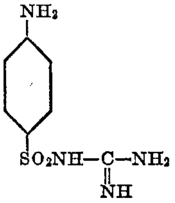 | Same as above | Do. |
| 4 | 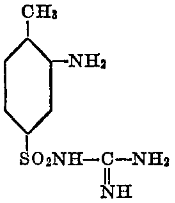 | do | Do. |
| 5 | 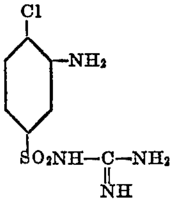 | do | Do. |
| 6 | 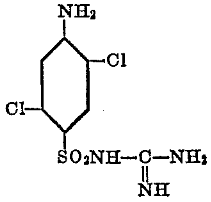 | do | Do. |
| 7 | 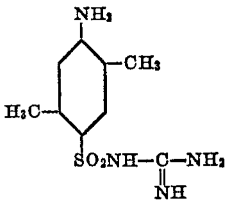 | 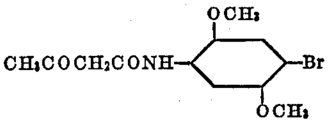 | Do. |
| 8 | 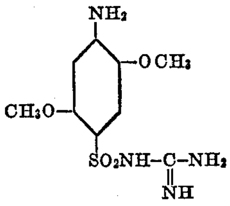 | 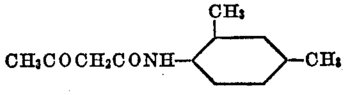 | Do. |
| 9 | 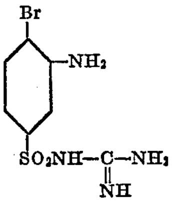 | 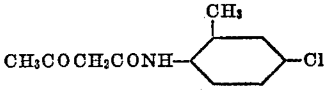 | Do. |
| 10 | 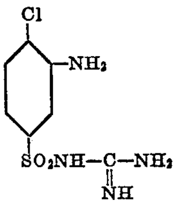 | 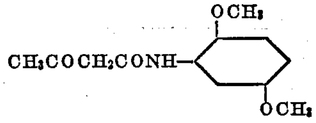 | Do. |

Representative pigments of the foregoing examples are as follows:

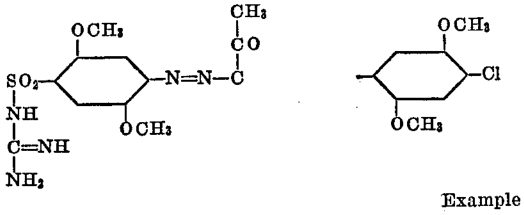

Example 1 and

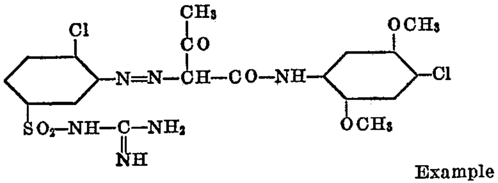

Example 5

Having thus disclosed the invention what we claim is:

1. A compound of the formula

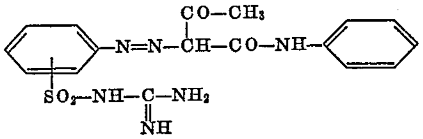

or a substituted derivative thereof, wherein each substituent is independently chloro, bromo, methyl or methoxy, and each substituent is attached to a phenyl ring.

2. A compound according to claim 1 having the formula

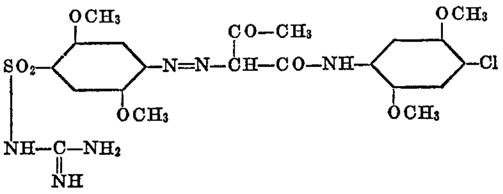

3. A compound according to claim 1 having the formula

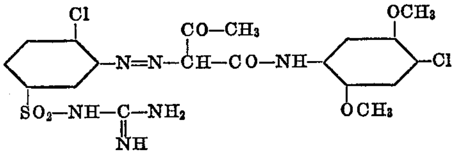

References Cited

UNITED STATES PATENTS 2,920,070 1/1960 Jirou et al. ........ 260—193 X

FOREIGN PATENTS 1,392,484 2/1965 France .............. 260—193

LEWIS GOTTS, Primary Examiner

C. F. WARREN, Assistant Examiner

UNITED STATES PATENT OFFICE
CERTIFICATE OF CORRECTION

Patent No. 3,741,953 Dated June 26, 1973

Inventor(s) Armand Henrard, Fritz Kehrer and Hans Wasem

It is certified that error appears in the above-identified patent and that said Letters Patent are hereby corrected as shown below:

Column 2 line 13 - the word "thus" should be --this--.

Column 2 line 59 example 2

" 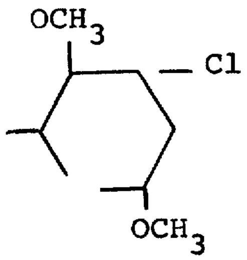 " should be -- 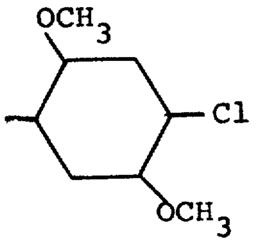 --.

Column 5 line 5 example 1

" 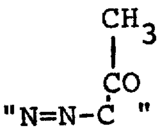 " should read -- 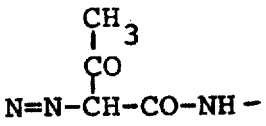 --.

Signed and sealed this 24th day of September 1974.

(SEAL)
Attest:

McCOY M. GIBSON JR.
Attesting Officer

C. MARSHLL DANN
Commissioner of Patents